(12) United States Patent
Ueno et al.

(10) Patent No.: US 9,891,948 B2
(45) Date of Patent: Feb. 13, 2018

(54) INFORMATION PROCESSING TO SHUT DOWN APPLICATION BASED ON START-UP TIME AND NETWORK ACCESS TIME

(71) Applicant: SONY CORPORATION, Tokyo (JP)

(72) Inventors: Masatoshi Ueno, Kanagawa (JP); Kenichi Seta, Kanagawa (JP); Masato Noguchi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 16 days.

(21) Appl. No.: 14/541,408

(22) Filed: Nov. 14, 2014

(65) Prior Publication Data

US 2015/0150022 A1    May 28, 2015

(30) Foreign Application Priority Data

Nov. 28, 2013 (JP) ................................ 2013-246347

(51) Int. Cl.
*G06F 9/46* (2006.01)
*G06F 9/48* (2006.01)

(52) U.S. Cl.
CPC .................... *G06F 9/485* (2013.01)

(58) Field of Classification Search
CPC .................... G06F 9/48; G06F 9/485
See application file for complete search history.

(56) References Cited

U.S. PATENT DOCUMENTS

| | | | | |
|---|---|---|---|---|
| 5,682,550 A * | 10/1997 | Brown | ................. | G06F 9/4443 710/10 |
| 5,907,702 A * | 5/1999 | Flynn | ................. | G06F 9/3802 712/E9.053 |
| 6,564,382 B2 * | 5/2003 | Duquesnois | ............. | H04N 7/52 348/510 |
| 7,370,330 B2 * | 5/2008 | Takahashi | ............. | G06F 9/4843 715/750 |
| 8,060,704 B2 * | 11/2011 | Nguyen | ................. | G06F 9/445 711/100 |
| 8,095,930 B2 * | 1/2012 | Chew | ................. | G06F 9/44594 718/103 |
| 8,190,682 B2 * | 5/2012 | Paterson-Jones | ..... | G06F 9/5055 709/205 |

(Continued)

FOREIGN PATENT DOCUMENTS

JP 2006-285871 A 10/2006

OTHER PUBLICATIONS

Chung, et al., "Enhancing User Experiences by Exploiting Energy and Launch Delay Tradeoff of Mobile Multimedia Applications"; 2012 IEEE; [retrieved on Nov. 22, 2015]; Retrieved from Internet <URL:http://ieeexplore.ieee.org/stamp/stamp.jsp?tp=&arnumber=6507034&tag=1>;pp. 86-86.*

(Continued)

*Primary Examiner* — Marina Lee
(74) *Attorney, Agent, or Firm* — Chip Law Group

(57) ABSTRACT

There is provided an information processing apparatus including a determination unit configured to determine, for each application, shift time length for each state shift while an application changes from a non-usable state to a usable state, and a control unit configured to shift a state of an application to the non-usable state, the application being specified on the basis of a result of the determination by the determination unit.

12 Claims, 13 Drawing Sheets

(56) References Cited

U.S. PATENT DOCUMENTS

| | | | | |
|---|---|---|---|---|
| 8,266,625 B2* | 9/2012 | Yuki | G06F 9/485 | 718/100 |
| 8,510,743 B2* | 8/2013 | Hackborn | G06F 9/461 | 715/764 |
| 8,539,498 B2* | 9/2013 | Bohra | G06F 9/4881 | 718/102 |
| 8,566,834 B2* | 10/2013 | Corn | G06F 9/5027 | 718/104 |
| 8,631,413 B2* | 1/2014 | Wada | G06F 9/485 | 718/100 |
| 8,635,630 B2* | 1/2014 | Iyer | G06Q 10/00 | 710/110 |
| 8,990,797 B2* | 3/2015 | Schiemann | G06F 9/4406 | 717/174 |
| 8,997,171 B2* | 3/2015 | Srour | G06F 9/485 | 713/1 |
| 9,009,292 B2* | 4/2015 | Ho | H04L 67/2847 | 709/217 |
| 9,052,929 B2* | 6/2015 | Fukuda | G06F 9/445 | |
| 9,154,840 B2* | 10/2015 | Kitazato | H04N 21/462 | |
| 2005/0034129 A1* | 2/2005 | Chew | G06F 9/44594 | 718/100 |
| 2007/0174490 A1* | 7/2007 | Choi | G06F 8/70 | 709/246 |
| 2008/0127201 A1* | 5/2008 | Mori | G06F 9/461 | 718/108 |
| 2010/0088707 A1* | 4/2010 | Corn | G06F 9/5027 | 718/104 |
| 2011/0252430 A1* | 10/2011 | Chapman | G06F 9/485 | 718/107 |
| 2012/0102495 A1* | 4/2012 | Gangam | G06F 9/485 | 718/102 |
| 2014/0344061 A1* | 11/2014 | Choi | G06Q 30/0267 | 705/14.64 |
| 2015/0150022 A1* | 5/2015 | Ueno | G06F 9/485 | 718/107 |

OTHER PUBLICATIONS

Guevara, et al., "A Performance Tuning Strategy for Complex Parallel Application"; 2010 18$^{th}$ Euromicro conference on Parallel, Distributed and Network-Based Processing; [retrieved on Nov. 22, 2015]; Retrieved from Internet <URL:http://ieeexplore.ieee.org/stamp/stamp.jsp?tp=&arnumber=5452503>;pp. 103-110.*

* cited by examiner

INFORMATION PROCESSING TO SHUT DOWN APPLICATION BASED ON START-UP TIME AND NETWORK ACCESS TIME

CROSS REFERENCE TO RELATED APPLICATIONS

This application claims the benefit of Japanese Priority Patent Application JP 2013-246347 filed Nov. 28, 2013, the entire contents of which are incorporated herein by reference.

BACKGROUND

The present disclosure relates to an information processing apparatus, an information processing method, and a storage medium.

Recently, with development of ability of computational resources such as a central processing unit (CPU) or memory, it has become common to use a plurality of applications in parallel. However, in a case where many applications are launched, computational resources may be depleted. With regard to the above issue, JP 2006-285871A discloses a technology that displays a warning to a user on a display when an application starting request is issued and a sum of each maximum memory usage amount of an already-started application and an application relating to the starting request exceeds a certain acceptable amount.

SUMMARY

However, according to the technology disclosed in JP 2006-285871A, a user have to wait for a long time for the application to restart in a case where a time for restarting the application is long, the application being shut down by the user after receiving the warning.

Accordingly, the present disclosure proposes a novel and improved information processing apparatus, information processing method and storage medium capable of selecting an application that releases computational resources in order to suppress increase of time before the application whose computational resource has been released becomes a usable state.

According to an embodiment of the present disclosure, there is provided an information processing apparatus including a determination unit configured to determine, for each application, shift time length for each state shift while an application changes from a non-usable state to a usable state, and a control unit configured to shift a state of an application to the non-usable state, the application being specified on the basis of a result of the determination by the determination unit.

According to another embodiment of the present disclosure, there is provided an information processing method including determining, for each application, shift time length for each state shift while an application changes from a non-usable state to a usable state, and shifting a state of an application to the non-usable state, the application being specified on the basis of a result of the determination.

According to another embodiment of the present disclosure, there is provided a non-transitory computer-readable storage medium having a program stored therein, the program causing a computer to function as a determination unit configured to determine, for each application, shift time length for each state shift while an application changes from a non-usable state to a usable state, and a control unit configured to shift a state of an application to the non-usable state, the application being specified on the basis of a result of the determination by the determination unit.

As described above, according to one or more of embodiments of the present disclosure, there are provided an information processing apparatus, information processing method and storage medium capable of selecting an application that releases computational resources in order to suppress increase of time before the application whose computational resource has been released becomes a usable state. Note that the present disclosure is not limited to the effect stated above and in addition to or in place of the effect stated above, may achieve any of the effects indicated in this specification or effects that can be understood from the specification.

DETAILED DESCRIPTION OF THE EMBODIMENT(S)

Figure 1:
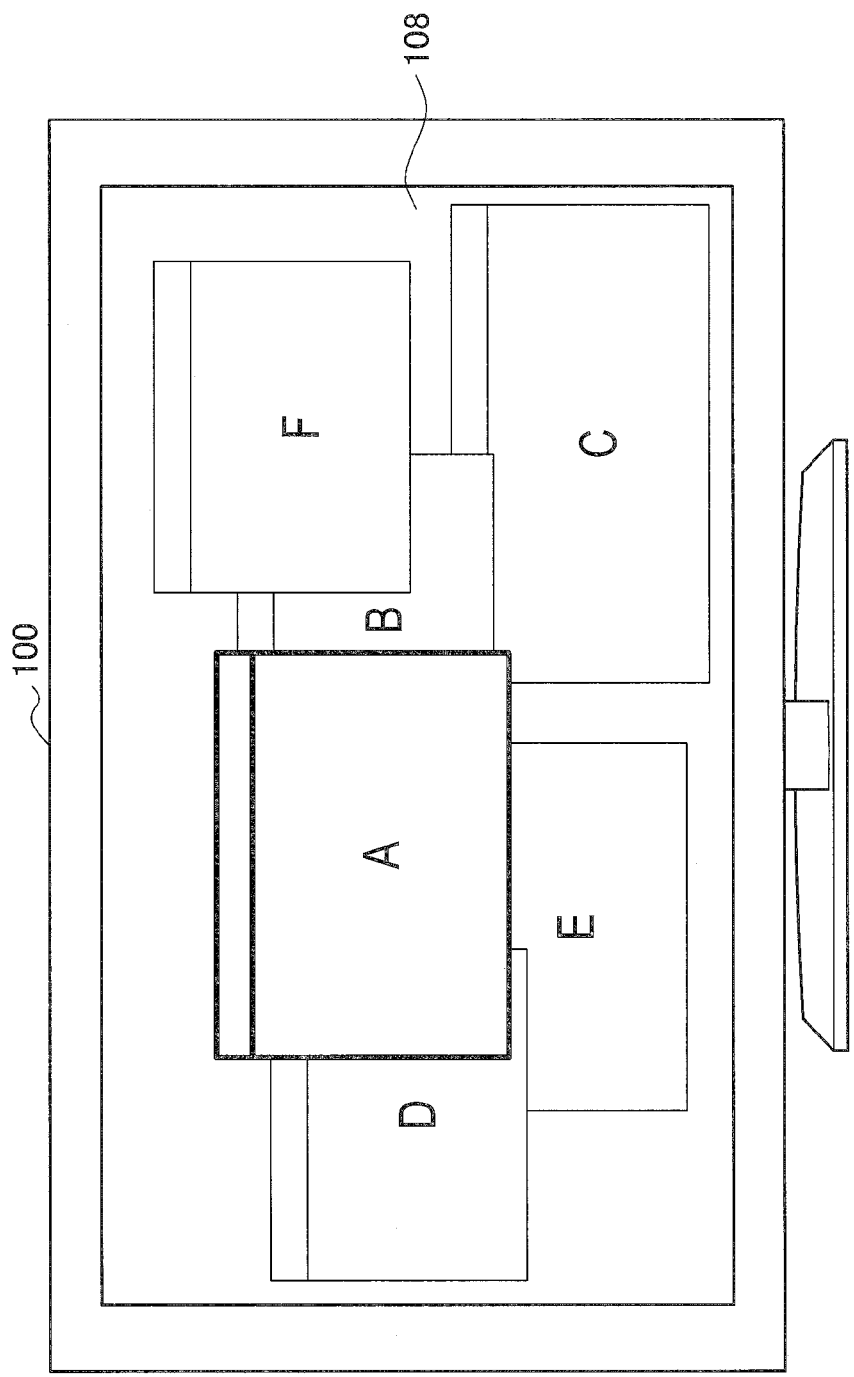
FIG. 1 is a diagram illustrating an overview of an information processing apparatus according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description is given in the following order.
1. Overview of Information Processing Apparatus according to Embodiment of Present Disclosure
2. First Embodiment (Example of Process based on Start-up Time of Application)
   2-1. Configuration of Information Processing Apparatus according to First Embodiment
   2-2. Process Performed by Information Processing Apparatus according to First Embodiment
   2-3. Modification of First Embodiment
3. Second Embodiment (Example of Process based on Start-up Time and Network Access time of Application)
   3-1. Configuration of Information Processing Apparatus according to Second Embodiment
   3-2. Process Performed by Information Processing Apparatus according to Second Embodiment
   3-3. Modification of Second Embodiment
4. Hardware Configuration of Information Processing Apparatus according to Embodiment of Present Disclosure
5. Conclusion 1. Overview of Information Processing Apparatus According to Embodiment of Present Disclosure First, with reference to FIG. 1, an overview of an information processing apparatus according to an embodiment of the present disclosure is explained. FIG. 1 is a diagram illustrating an overview of an information processing apparatus according to an embodiment of the present disclosure.

As shown in FIG. 1, an information processing apparatus 100 has an application management function for operating a plurality of applications in parallel. According to the application management function, a part of computational resources is allocated to each application, and a plurality of applications are started and managed. In addition, the information processing apparatus 100 also has a window management function for generating, displaying, and managing a window relating to each of the applications. Accordingly, the information processing apparatus 100 is capable of displaying the plurality of windows relating to the applications on a display unit 108 which the information processing apparatus 100 further includes. Note that, the computational resource allocated to the application is released when the application is shut down. For example, as shown in FIG. 1, the information processing apparatus 100 is capable of displaying windows A to F relating to the applications on the display unit 108.

Here, a part of computational resources is allocated to an application every time when the application is launched. Accordingly, the computational resources may be depleted if the application is not shut down and new applications are constantly launched. Accordingly, the user has to shut down any of the launched applications. At this time, the user may have to wait for a long time for the application to restart when shutting down the application having a long start-up time. Accordingly, the information processing apparatus 100 determines whether to perform an application shutdown process on the basis of a usage situation of computational resources. In a case where it is determined to perform the application shutdown process, the information processing apparatus 100 shuts down an application having a shorter start-up time than other applications.

For example, the information processing apparatus 100 may periodically acquire available memory, and may determine whether to perform the application shutdown process. Subsequently, for example, when the available memory becomes 5% or less, the information processing apparatus 100 performs the application shutdown process. For example, as shown in FIG. 1, the information processing apparatus 100 selects an application relating to the window E that has relatively short start-up time from among applications relating to the launched windows A to F. Next, the information processing apparatus 100 shuts down the selected application of the window E.

As described above, the information processing apparatus 100 according to the embodiment of the present disclosure shuts down the application having shorter start-up time than the other applications. Accordingly, even if the shutdown application is restarted, it is possible to make user waiting time until the restart is finished shorter than a case where the other applications are shut down. Note that, FIG. 1 shows a television as an example of the information processing apparatus 100. However, the information processing apparatus 100 may be a personal computer, a tablet terminal, a smartphone, or the like. For convenience of explanation, information processing apparatuses 100 according to first and second embodiments are distinguished by suffixing reference numerical corresponding to respective embodiments to the information processing apparatuses 100, such as an information processing apparatus 100-1 and an information processing apparatus 100-2.

2. First Embodiment (Example of Process Based on Start-up Time of Application)

Figure 2:
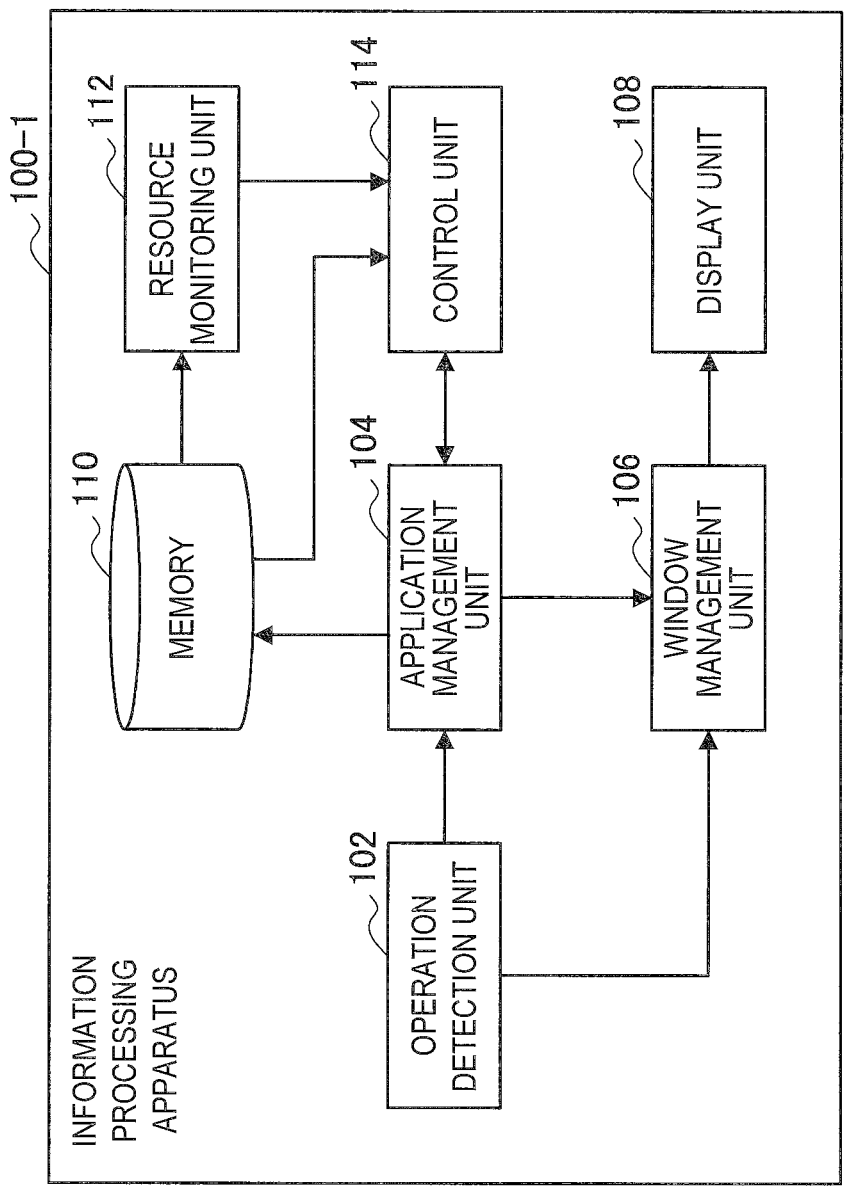
FIG. 2 is a block diagram schematically showing a functional configuration of an information processing apparatus according to a first embodiment of the present disclosure.

2-1. Configuration of Information Processing Apparatus According to First Embodiment The overview of the information processing apparatus 100 according to the embodiment of the present disclosure has been explained. Next, with reference to FIG. 2, a configuration of the information processing apparatus 100-1 according to a first embodiment of the present disclosure is explained. FIG. 2 is a block diagram schematically showing a functional configuration of the information processing apparatus 100-1 according to the first embodiment of the present disclosure.

As shown in FIG. 2, the information processing apparatus 100-1 includes an operation detection unit 102, an application management unit 104, a window management unit 106, a display unit 108, memory 110, a resource monitoring unit 112, and a control unit 114. Note that, the application management unit 104 is an example of the determination unit described in claims.

The operation detection unit 102 detects a user operation performed on a window. Specifically, the operation detection unit 102 detects an operation performed on a window, on the basis of input information acquired from an input apparatus operated by a user.

Figure 3:
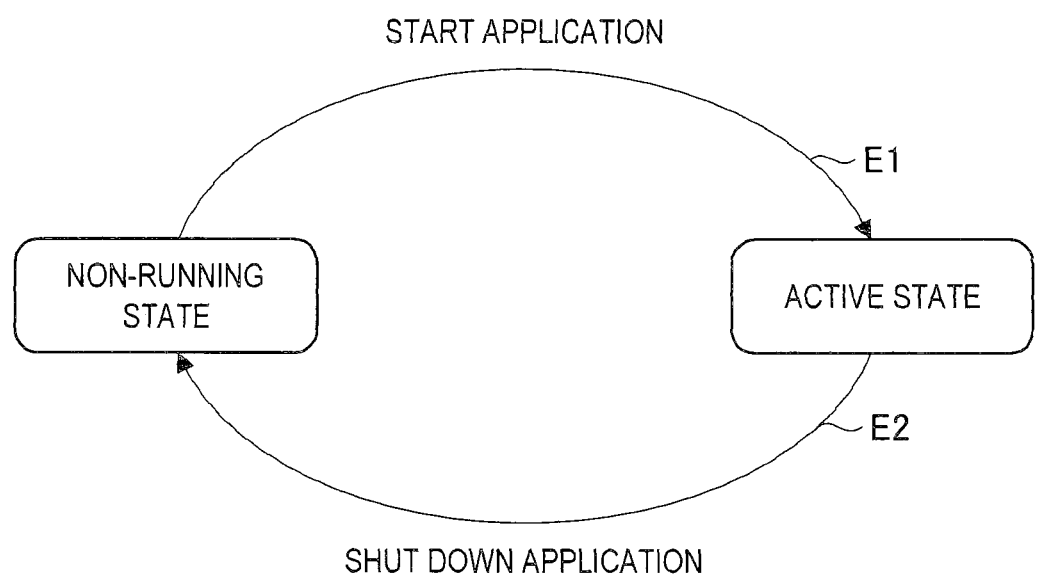
FIG. 3 is a state shift diagram of an application in an information processing apparatus according to the first embodiment of the present disclosure.

The application management unit 104 shifts a state of an application. Specifically, when the operation detection unit 102 detects a user operation for starting an application, the application management unit 104 starts the application in response to the user operation, and shifts the state of the application from a non-running state to an active state. In addition, the application management unit 104 measures the start-up time in which the state of the application shifts from the non-running state to the active state, and causes the memory 110 to store a result of the measurement of the start-up time. Moreover, the application management unit 104 shuts down the application on the basis of an application shutdown instruction from the later-described control unit 114, and shifts the state of the application from the active state to the non-running state. Here, with reference to FIG. 3, states of an application are explained. FIG. 3 is a state shift diagram of an application in the information processing apparatus 100-1 according to the first embodiment of the present disclosure.

As shown in FIG. 3, the states of the application include the non-running state and the active state. The non-running state is a state where an application is not started. The active state is a state where a user can use an application, such as a state capable of viewing or performing input operation. For example, as shown in FIG. 3, in the non-running state, when the application is started by a user operation or the like, the state of the application shifts to the active state (E1). Alternatively, in the active state, when the application is shut down by a user operation or the later-described control unit 114, the state of the application shifts to the non-running state (E2).

Here, returning to the explanation of the configuration of the information processing apparatus 100-1 with reference to FIG. 2, the application management unit 104 instructs the window management unit to generate or delete a window relating to an application in a case where the window is necessary for the application to be started.

The window management unit 106 manages windows so as to generate or delete a window and change display of the window, for example. Specifically, the window management unit 106 generates or deletes a window on the basis of an instruction to generate or delete the window, the instruction being issued by the application management unit 104. In addition, when the operation detection unit 102 detects a user operation to change display of a window, the window management unit 106 changes the display of the window relating to the user operation.

The display unit 108 displays a window generated by the window management unit 106.

The memory 110 stores information about an application. Specifically, the memory 110 stores start-up time and the like of the application, the start-up time having been measured by the application management unit 104.

The resource monitoring unit 112 monitors the usage situation of computational resources by the information processing apparatus 100-1. Specifically, the resource monitoring unit 112 monitors available computational resources in the memory, CPU, and the like of the information processing apparatus 100-1, or lack of allocation of computational resources to an application process, for example. Subsequently, in a case where the available computational resources becomes 0%, or in a case where there is a lack of allocation of computational resources to an application process, the resource monitoring unit 112 notifies the later-described control unit 114 of monitor result information. In this way, depletion of the computational resources is detected, and the control unit 114 is notified of the monitor result information. Accordingly, it is possible to prevent the computational resources from being kept in the depletion state.

The example that the monitor result information is notified when the available computational resources becomes 0% has been explained as described in the above. However, the monitor result information may be notified when the available computational resources becomes less than a certain value, for example. In this way, before the computational resources are depleted, the control unit 114 is notified of the monitor result information. Accordingly, it is possible to suppress the depletion of the computational resources.

In addition, the example that the resource monitoring unit notifies the control unit 114 of the monitor result information in a case where a notification condition of the monitor result information is satisfied has been explained in the above. However, in a case where it is estimated that the notification condition of the monitor result information is satisfied by starting an application, the resource monitoring unit may notifies the control unit 114 of the monitoring result information before the application is started. Specifically, the application management unit 104 notifies the resource monitoring unit 112 of information about computational resources that have to be allocated to an application before the application is started. Subsequently, on the basis of the notification, the resource monitoring unit 112 determines whether the notification condition of the monitoring result information is satisfied by starting the application. In a case where it is determined that the notification condition is satisfied, the resource monitoring unit 112 notifies the control unit 114 of the monitoring result information. In this way, the available computational resources are assured before the application is started. Accordingly, it is possible to suppress the depletion of the computational resources.

The control unit 114 shifts a state of an application to the non-running state, the application being specified on the basis of a measurement result of start-up time of the application. Specifically, when the resource monitoring unit 112 notifies the control unit 114 of the monitoring result information, the control unit 114 reads start-up time of applications stored in the memory 110, and selects an application having shorter start-up time than the other applications. Subsequently, the control unit 114 notifies the application management unit 104 of a shutdown instruction of the selected application.

2-2. Process Performed by Information Processing Apparatus According to First Embodiment Next, a process performed by the information processing apparatus 100-1 according to the first embodiment of the present disclosure is explained. The information processing apparatus 100-1 performs a process relating to management of applications and a shutdown determination process of applications. Accordingly, the process relating to management of applications and the shutdown determination process of applications are explained.

Figure 4:
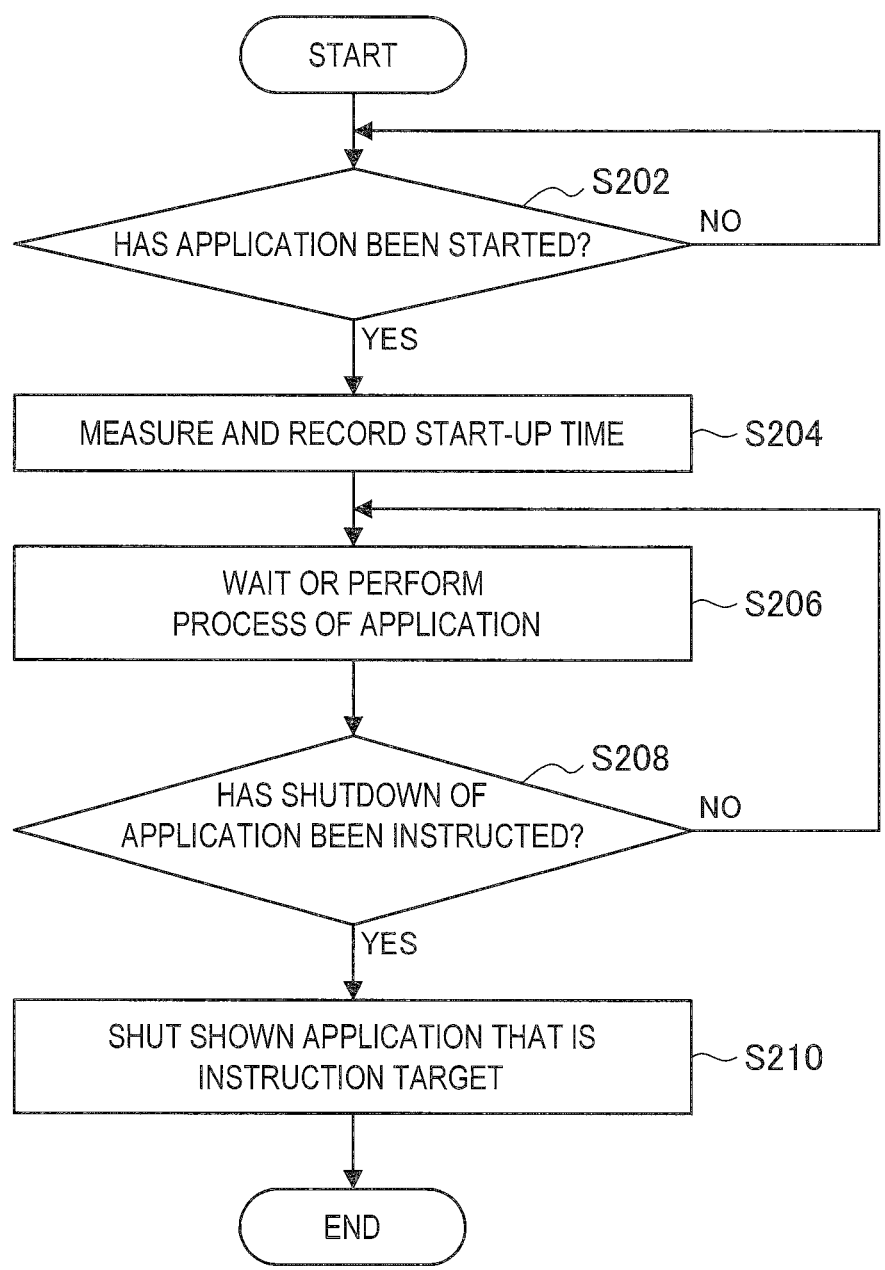
FIG. 4 is a flowchart schematically showing a process of managing an application in an information processing apparatus according to the first embodiment of the present disclosure.

First, with reference to FIG. 4, the process relating to management of applications in the information processing apparatus 100-1 is explained. FIG. 4 is a flowchart schematically showing the process relating to management of an application in the information processing apparatus 100-1 according to a first embodiment of the present disclosure. Note that, explanation overlapping with the explanation of the configuration of the information processing apparatus 100-1 is omitted.

First, the application management unit 104 waits or performs another process until an application is started (Step S202).

In Step S202, in a case where the operation detection unit 102 detects a user operation that starts an application, the application management unit 104 measures and records start-up time (Step S204). Specifically, the application management unit 104 starts an application relating to the user operation detected by the operation detection unit 102, measures the start-up time, and cause the memory 110 to store a result of the measurement of the start-up time.

Next, the application management unit 104 waits or performs a process of an application (Step S206). Specifically, in a case where the user operation or the like instruct to perform the process on the application, the application management unit 104 executes the process of the application relating to the user operation. While the user operation or the like relating to the instruction to execute the process of the application is not being performed, the application management unit 104 waits.

The application management unit 104 repeats a process in Step S206 until shutdown of the application is instructed (Step S208).

In Step S208, in a case where the shutdown of the application is instructed, the application management unit 104 shuts shown the application that is an instruction target (Step S210). Specifically, in a case where the operation detection unit 102 detects a user operation relating to shutdown of the application, or in a case where the control unit 114 notifies the application management unit of a shutdown instruction, the application management unit 104 shuts down the application.

Figure 5:
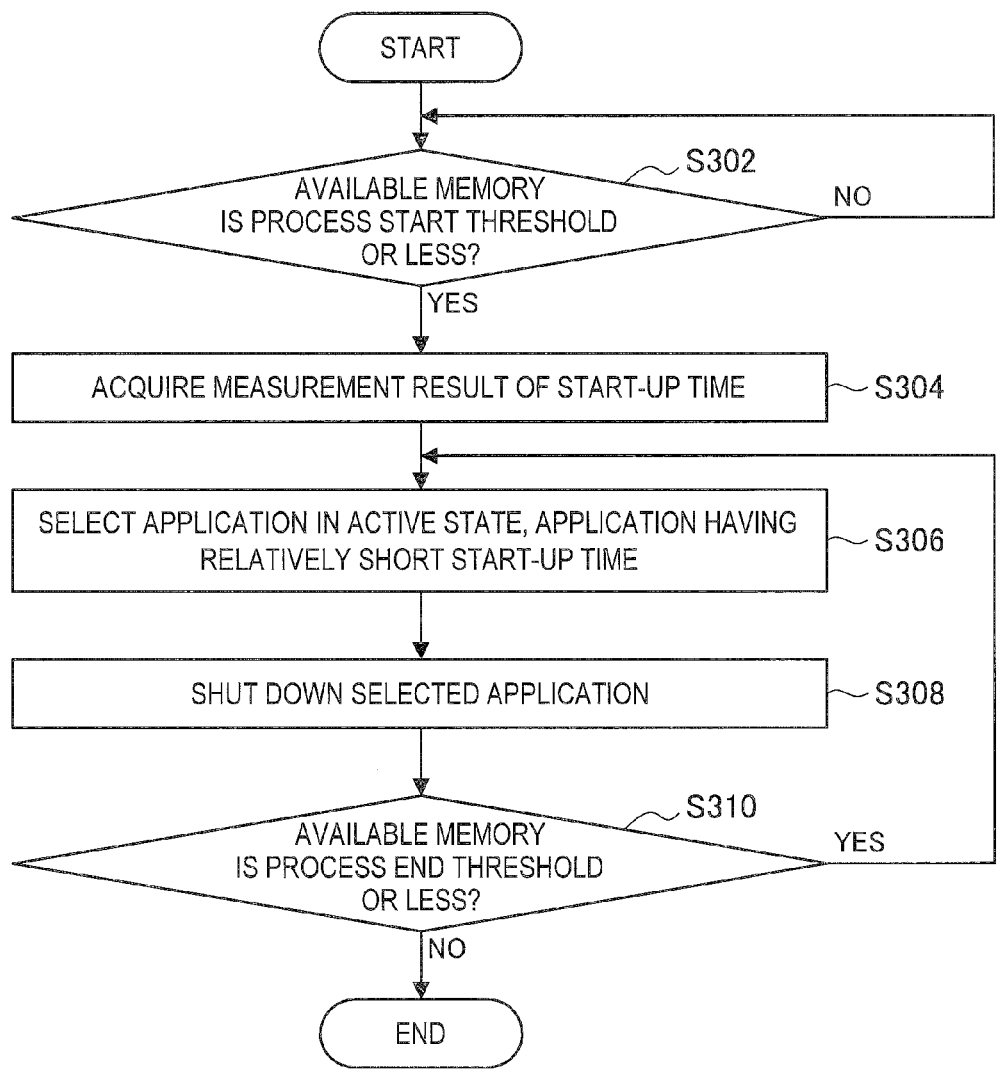
FIG. 5 is a flowchart schematically showing a process of determining shutdown of an application in an information processing apparatus according to the first embodiment of the present disclosure.

Next, with reference to FIG. 5, a shutdown determination process of an application in the information processing apparatus 100-1 is explained. FIG. 5 is a flowchart schematically showing a process of determining shutdown of an application in the information processing apparatus 100-1 according to the first embodiment of the present disclosure. Note that, explanation overlapping with the explanation of the configuration of the information processing apparatus 100-1 is omitted.

First, the control unit 114 waits until available memory becomes a process start threshold or less (Step S302). Specifically, when it is detected that the available memory becomes the process start threshold or less, the resource monitoring unit 112 notifies the control unit 114 of monitoring result information. For example, the process start threshold may be a numerical value such as 5% of the available memory.

In a case where the available memory becomes the process start threshold or less in Step S302, the control unit 114 acquires a measurement result of the start-up time (Step S304). Specifically, when the resource monitoring unit 112 notifies the control unit 114 of the monitoring result information, the control unit 114 reads start-up time of applications from the memory 110.

Next, the control unit 114 selects an application in an active state, the application having relatively short start-up time (Step S306). For example, the control unit 114 may select an application whose read start-up time is relatively shortest. Note that, the control unit 114 may select an application whose start-up time is shorter than certain time. Accordingly, a plurality of applications can be selected.

Next, the control unit 114 shuts down the selected application (Step S308). Specifically, the control unit 114 notifies the application management unit 104 of a shutdown instruction of the application selected in Step S306.

Next, the control unit 114 determines whether the available memory is a process end threshold or less (Step S310). Specifically, the control unit 114 inquires the available memory of the resource monitoring unit 112. In a case where the available memory indicated by a response from the resource management unit 112 is a process end threshold or less, the process returns to Step S306. In a case where the available memory is greater than the process end threshold, the control unit 114 ends the process. Note that, the process end threshold is a value greater than the process start threshold. For example, the process end threshold may be a numerical value such as 10% of the available memory. As described above, by setting the process end threshold to be greater than the process start threshold, it is possible to suppress frequent occurrence of application shutdown processes.

As described above, according to the first embodiment of the present disclosure, the information processing apparatus 100-1 shuts down the application having shorter start-up time than the other applications. Accordingly, in a case where the shutdown application is restarted, it is possible to restart the shutdown application in shorter time than restart time in a case of shutting down another application. Accordingly, it is possible to suppress increase of user waiting time for restarting the application.

2-3. Modification of First Embodiment

The first embodiment of the present disclosure has been explained above. Note that, the present embodiment is not limited to the above described examples. Modifications of the present embodiment are explained below.

As a modification of the present embodiment, the control unit 114 may select an application for shifting a state of an application on the basis of a measurement result of start-up time of the application and elapsed time length of the application in the active state. Specifically, the control unit 114 may select an application whose start-up time is shorter than other applications and whose elapsed time in the active state is longer than the other application. For example, the control unit 114 may calculate a comparative parameter R for each application by using a calculation formula $R=t*1/n$. The t represents start-up time length of an application, and the n represents elapsed time length of the application in the active state. Note that, the elapsed time length of the application in the active state may be initialized after the state of the application is shifted to the non-running state. Subsequently, the control unit 114 selects an application whose calculated parameter R is smaller than other applications.

As described above, according to the modification of the present embodiment, the control unit 114 may select an application whose start-up time is shorter than other applications and whose elapsed time in the active state is longer than the other application. Accordingly, an application whose purpose may have been achieved and that may be not used is easily shut down, and it is possible to suppress occurrence of user waiting time in a case where the shutdown application is restarted.

Note that, the example that the control unit 114 uses elapsed time length of an application in the active state when selecting the application has been described above. However, the control unit 114 may use time elapsed after a last user operation performed on an application in the active state. In this case, by shutting down an application that is more likely not to have been used, convenience of the user can be improved.

3. Second Embodiment (Example of Process Based on Start-Up Time and Network Access Time of Application)

The first embodiment of the present disclosure has been explained above. Next, a second embodiment of the present disclosure is explained. According to the second embodiment of the present disclosure, the information processing apparatus 100-2 selects an application to be shut down on the basis of each measurement result of start-up time and network access time.

Figure 6:
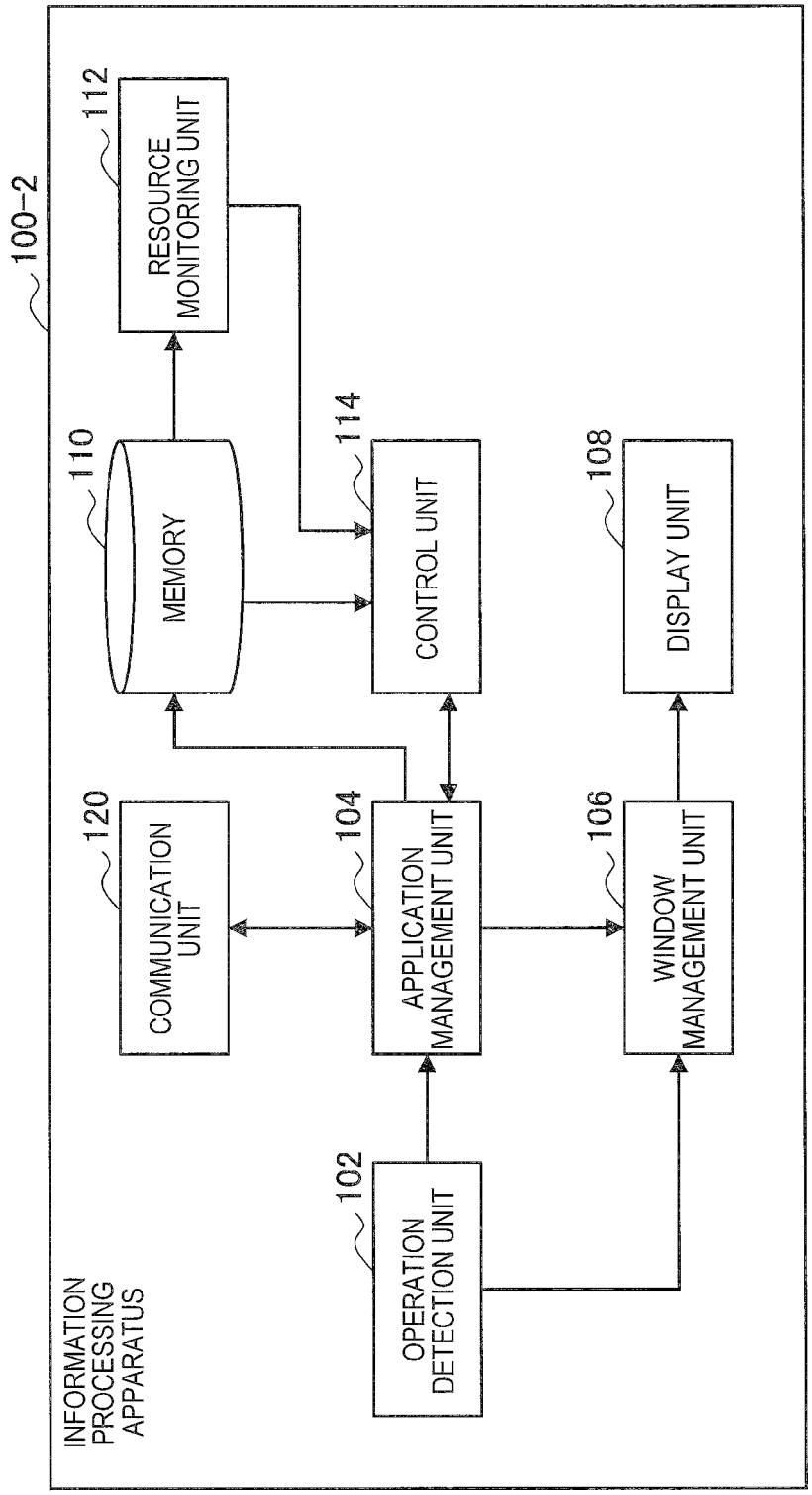
FIG. 6 is a block diagram schematically showing a functional configuration of an information processing apparatus according to a second embodiment of the present disclosure.

3-1. Configuration of Information Processing Apparatus According to Second Embodiment First, with reference to FIG. 6, a configuration of the information processing apparatus 100-2 according to the second embodiment of the present disclosure is explained. FIG. 6 is a block diagram schematically showing a functional configuration of the information processing apparatus 100-2 according to the second embodiment of the present disclosure. Note that, an explanation of a configuration substantially the same as the configuration of the information processing apparatus 100-1 according to the first embodiment of the present disclosure is omitted.

As shown in FIG. 6, the information processing apparatus 100-2 includes an operation detection unit 102, an application management unit 104, a window management unit 106, a display unit 108, memory 110, a resource monitoring unit 112, a control unit 114, and a communication unit 120.

Figure 7:
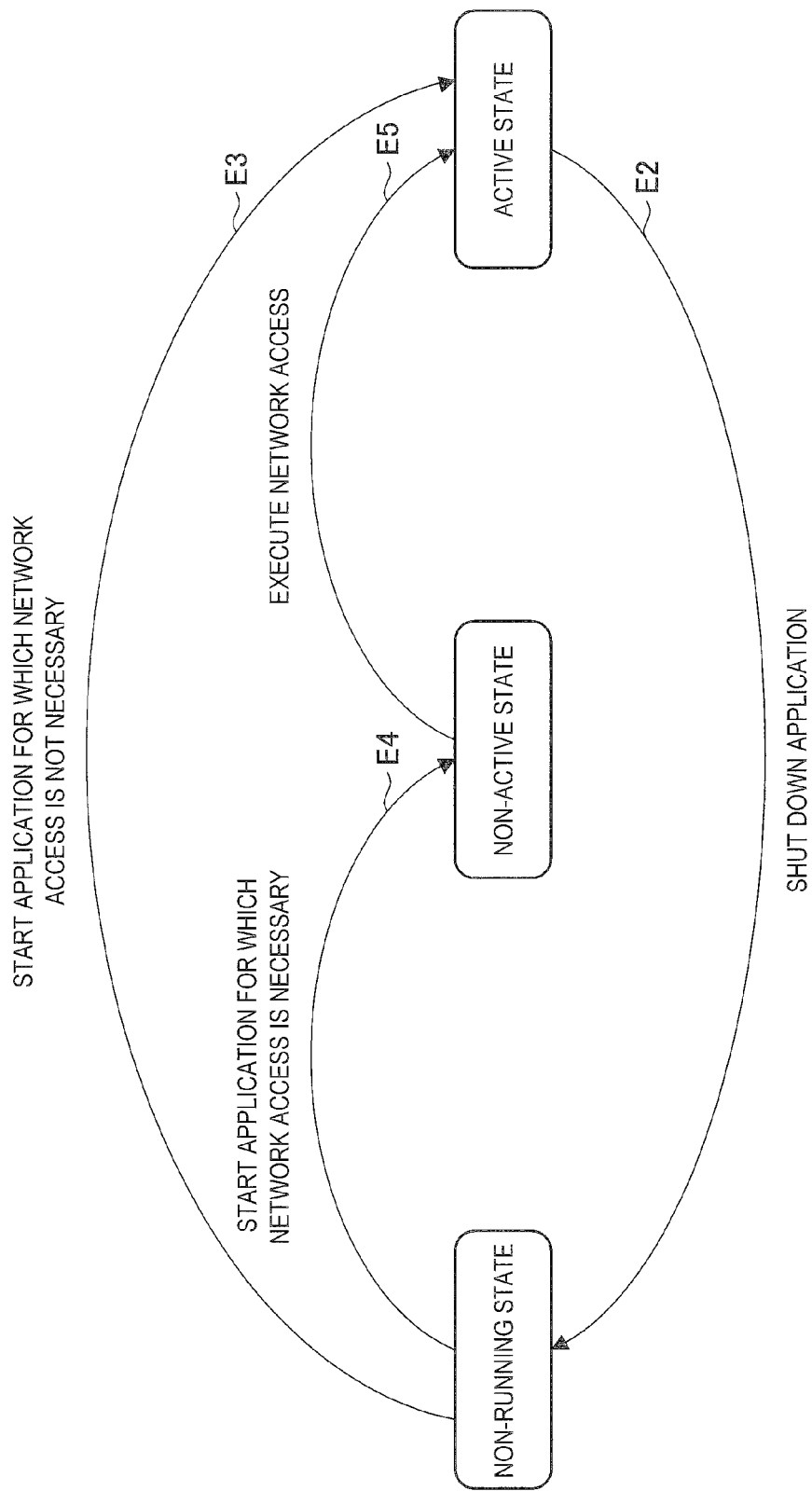
FIG. 7 is a state shift diagram of an application in an information processing apparatus according to the second embodiment of the present disclosure.

In a case where an application to be started performs network access when the application is started, the application management unit 104 shifts the state of the application from the non-running state to a non-active state, and then shifts the state to the active state. Specifically, when the operation detection unit 102 detects a user operation for starting an application, the application management unit 104 starts the application in response to the user operation, and shifts the state of the application from the non-running state to the non-active state. Subsequently, after receiving a network access request from the application, the application management unit 104 notifies the communication unit 120 of the request, causes the communication unit 120 to perform the network access, and shifts a state of the application from the non-active state to the active state. In addition, the application management unit 104 measures start-up time in which the state of the application shifts from the non-running state to the not-active state and network access time in which the state shifts from the non-active state to the active state, and causes the memory 110 to store results of the measurements. With reference to FIG. 7, states of an application are explained. FIG. 7 is a state shift diagram of an application in the information processing apparatus 100-2 according to the second embodiment of the present disclosure.

As shown in FIG. 7, the states of the application include the non-running state, the active state, and the non-active state. The non-active state is a state in which starting of the application has been completed but network access is not performed. That is, the non-active state is a state that does not perform a part of user operations such as operations other than shutdown operation or the like of the application, or a process for which the network access is necessary.

For example, as shown in FIG. 7, in the non-running state, in a case where the application for which the network access is not necessary is started, the state of the application shifts from the non-active state to the active state (E3). Alternatively, in the non-running state, in a case where the application for which the network access is necessary is started, the state of the application shifts to the non-active state (E4). In addition, in the non-active state, in a case where the network access is executed, the state of the application shifts to the active state (E5).

Here, returning to the explanation of the configuration of the information processing apparatus 100-2 with reference to FIG. 6, the control unit 114 shifts a state of an application to the non-running state, the state of the application being specified on the basis of each measurement results of the start-up time and the network access time of the application. Specifically, when the resource monitoring unit 112 notifies the control unit 114 of the monitoring result information, the control unit 114 reads start-up time and network access time of applications stored in the memory 110, and selects an application for which the sum of the read start-up time and the read network access time is shorter than the other application. Subsequently, the control unit 114 notifies the application management unit 104 of a shutdown instruction of the selected application.

The communication unit 120 communicates with an apparatus or the like that is outside of the information processing apparatus 100-2. Specifically, when the application management unit 104 notifies the communication unit 120 of a network access request, the communication unit 120 starts to communicate with external apparatus or the like. After the communication is finished, the communication unit 120 notifies the application management unit 104 of this.

3-2. Process Performed by Information Processing Apparatus According to Second Embodiment Next, a process performed by the information processing apparatus 100-2 according to the second embodiment of the present disclosure is explained. Accordingly, in a way similar to the first embodiment, the process relating to management of applications and the shutdown determination process of applications are explained.

Figure 8:
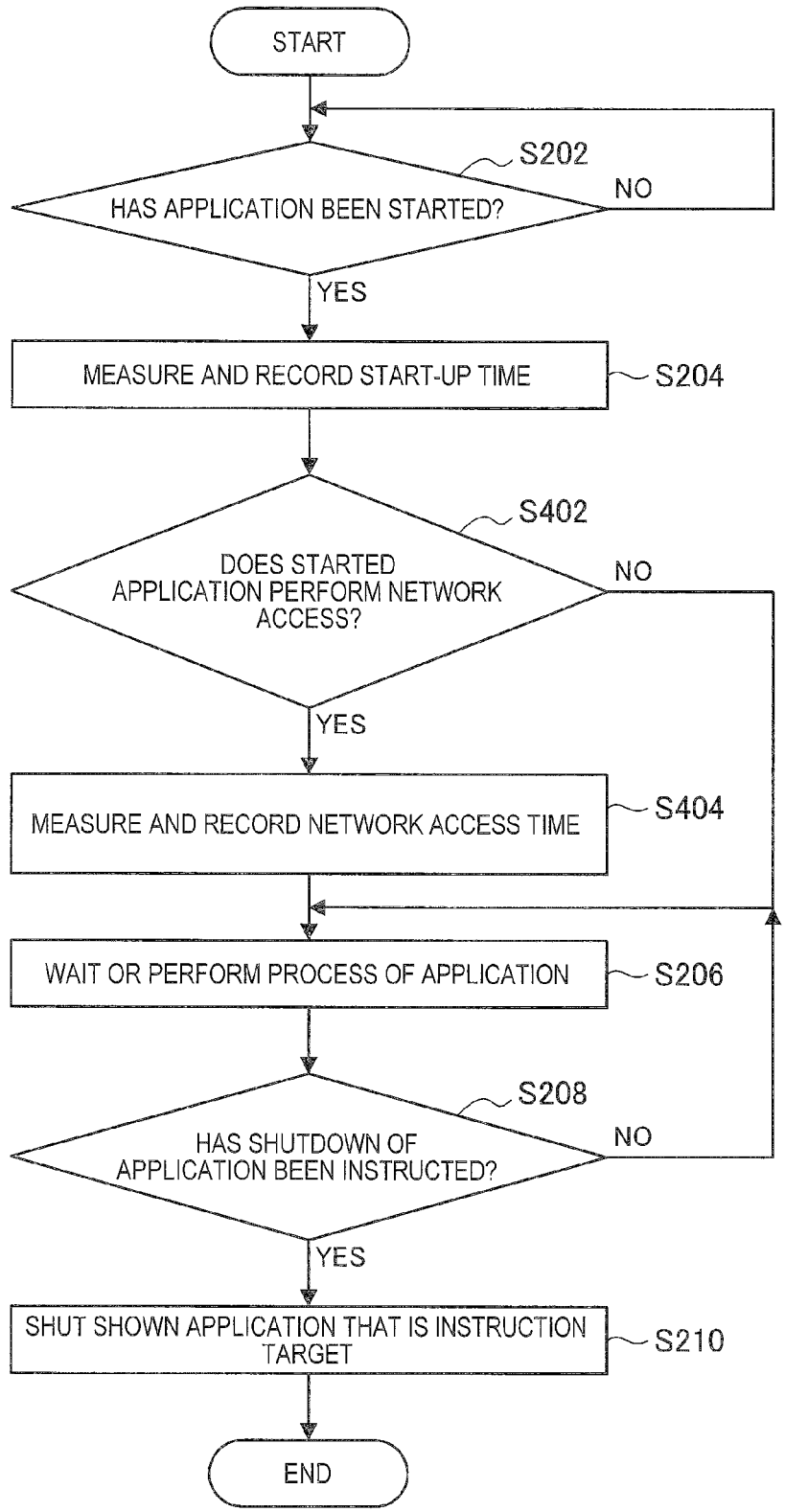
FIG. 8 is a flowchart schematically showing a process of managing an application in an information processing apparatus according to the second embodiment of the present disclosure.

First, with reference to FIG. 8, a process relating to management of an application in the information processing apparatus 100-2 is explained. FIG. 8 is a flowchart schematically showing the process relating to management of an application in the information processing apparatus 100-2 according to the second embodiment of the present disclosure. Note that, explanation overlapping with the explanation of the first embodiment and the explanation of the configuration of the information processing apparatus 100-2 is omitted.

After the processes in Steps S202 and S204 are executed, the application management unit 104 determines whether the started application performs network access (Step S402). Specifically, after receiving a network access request from the application, the application management unit 104 determines that the application performs network access.

In a case where it is determined that the started application performs network access in Step S402, the application management unit 104 measures and records network access time (Step S404).

After the process in Step S404 is executed, processes in Steps S206 to S210 are performed.

Figure 9:
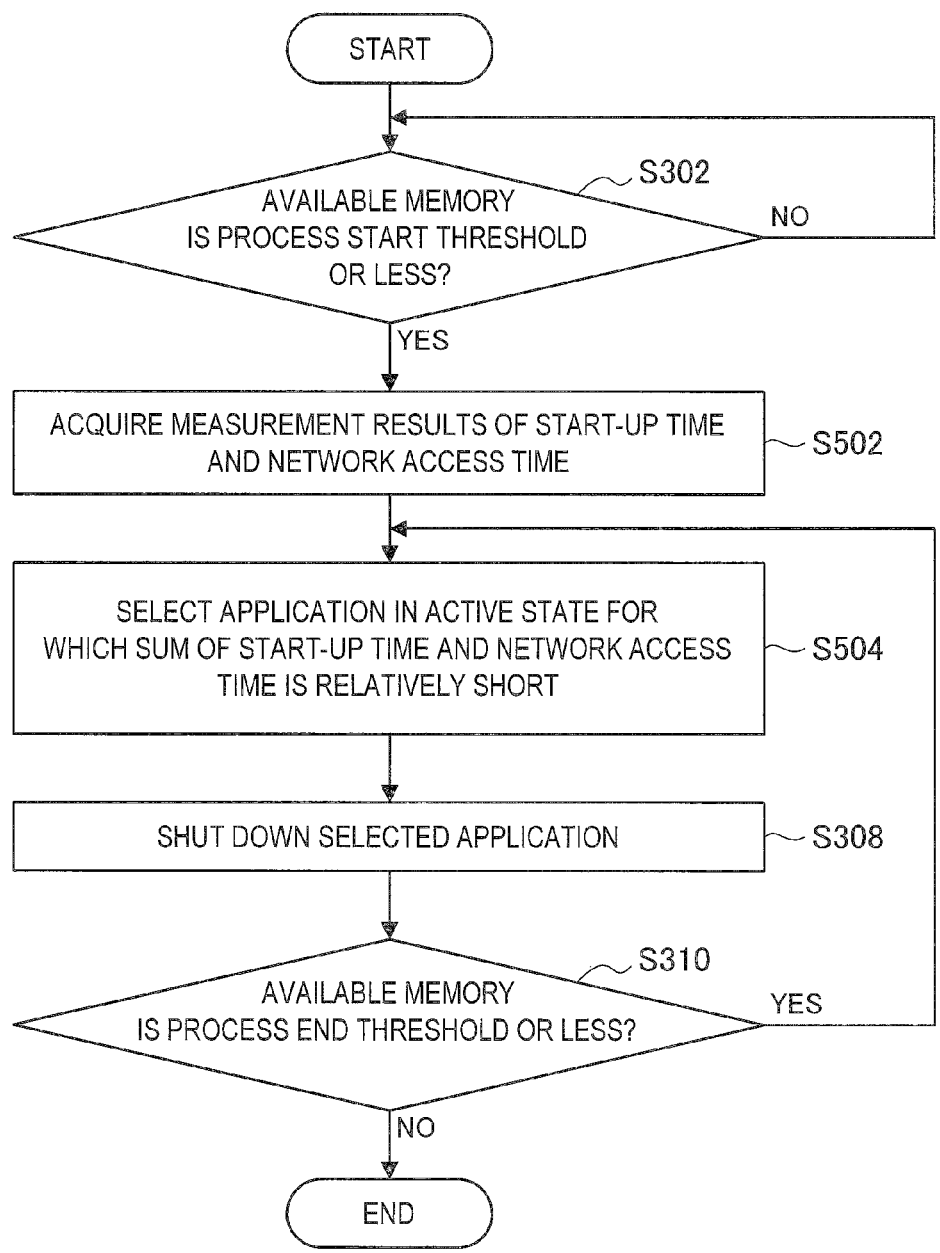
FIG. 9 is a flowchart schematically showing a process of determining shutdown of an application in an information processing apparatus according to the second embodiment of the present disclosure.

Next, with reference to FIG. 9, a shutdown determination process of an application in the information processing apparatus 100-2 is explained. FIG. 9 is a flowchart schematically showing a process of determining shutdown of an application in the information processing apparatus 100-2 according to the second embodiment of the present disclosure. Note that, explanation overlapping with the explanation of the first embodiment and the explanation of the configuration of the information processing apparatus 100-2 is omitted.

In Step S302, in a case where available memory becomes the process start threshold or less, the control unit 114 acquires measurement results of the start-up time and network access time (Step S502).

Next, the control unit 114 selects an application in an active state for which the sum of the start-up time and the network access time is relatively short (Step S504). For example, the control unit 114 may select an application for which the sum of the read start-up time and the read network access time is relatively shortest among other applications. Note that, the control unit 114 may select an application for which the sum of the start-up time and the network access time is relatively shorter than certain time. Alternatively, the control unit 114 may set certain time with regard to each of the start-up time and the network access time, compare each of the start-up time and the network access time with the certain time, and select an application for which one or both of the start-up time and the network access time are shorter than the certain time. In this way, by detailing setting of the certain time, it is possible to select an application corresponding to more dedicated user needs.

After the process in Step S504 is executed, the process proceeds to Steps S308 and S310. Note that, in a case where the available memory is 10% or less in Step S310, the process returns to Step S504.

As described above, according to the second embodiment of the present disclosure, the information processing apparatus 100-2 shuts down the application for which the sum of the start-up time and the network access time is relatively short. In this way, an application is selected in consideration of not only the start-up time but also the network access time. Accordingly, it is possible to suppress increase of user waiting time until a state of the application shifts to the active state.

3-3. Modification of Second Embodiment

The second embodiment of the present disclosure has been explained above. Note that, the present embodiment is not limited to the above described examples. A first modification to third modification of the present embodiment are explained below.

(First Modification)

Figure 10:
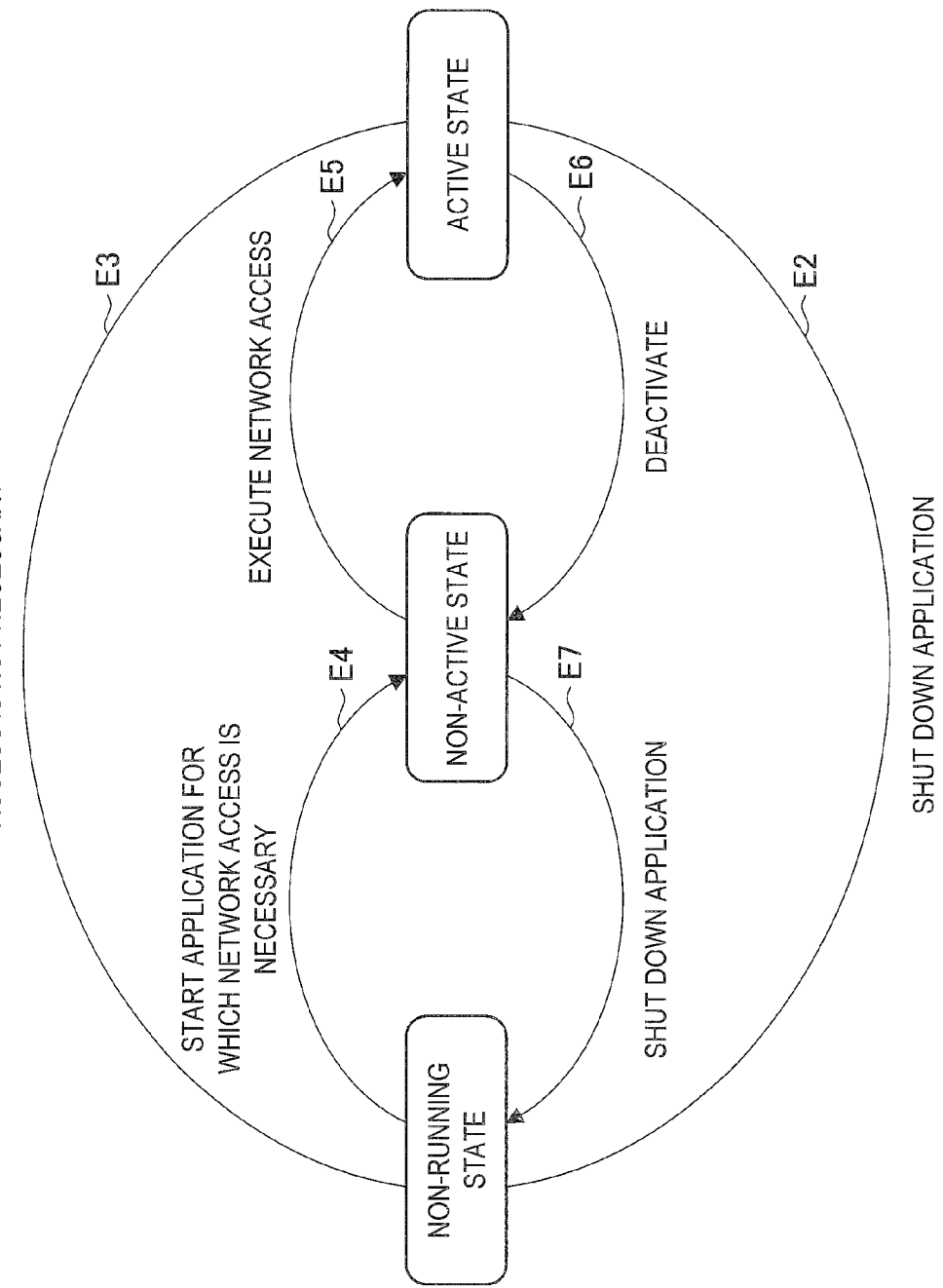
FIG. 10 is a state shift diagram of an application in an information processing apparatus according to a first modification of the second embodiment of the present disclosure.

As a first modification of the present embodiment, the control unit 114 may shift a state of an application to the non-active state that is an example of the non-operated state described in claims, the state of the application being specified on the basis of a measurement result of network access time. Specifically, the control unit 114 shifts an application in the active state to the non-active state, the application having network access time shorter than other applications. First, with reference to FIG. 10, states of an application are explained. FIG. 10 is a state shift diagram of an application in the information processing apparatus 100-2 according to the first modification of the second embodiment of the present disclosure. Note that, explanation overlapping with the explanations of the first embodiment and the second embodiment are omitted.

For example, as shown in FIG. 10, when an application in the active state is deactivated, the state of the application shifts to the non-active state (E6). Specifically, when a user performs a deactivation operation, or when the control unit 114 performs a deactivation process, a state shift of E6 is performed. For example, the deactivation operation may be a window minimization operation or a window iconization operation. In addition, when shifting to the non-active state, display of a window or the like relating to an application may be changed. For example, the window minimization operation or the window iconization operation may be performed. In this way, in the non-active state, there are fewer processes to be executed than the active state and a display region of a window or the like relating to an application is narrowed. Accordingly, when the active state is shifted to the non-active state, a part of allocated computational resources is released.

In addition, in the non-active state, in a case where the network access is executed, the state of the application shifts to the active state (E5). Specifically, when a non-active cancel operation is performed in the non-active state, network access is executed and a state shift of E5 is performed. For example, the non-active cancel operation may be a window display selection operation or a window icon cancel operation.

In addition, in the non-active state, in a case where an application is shut down, the state of the application shifts from the non-active state to the non-running state (E7). Specifically, when a user operation for shutting down the application is performed, a state shift of E7 is performed.

Figure 11:
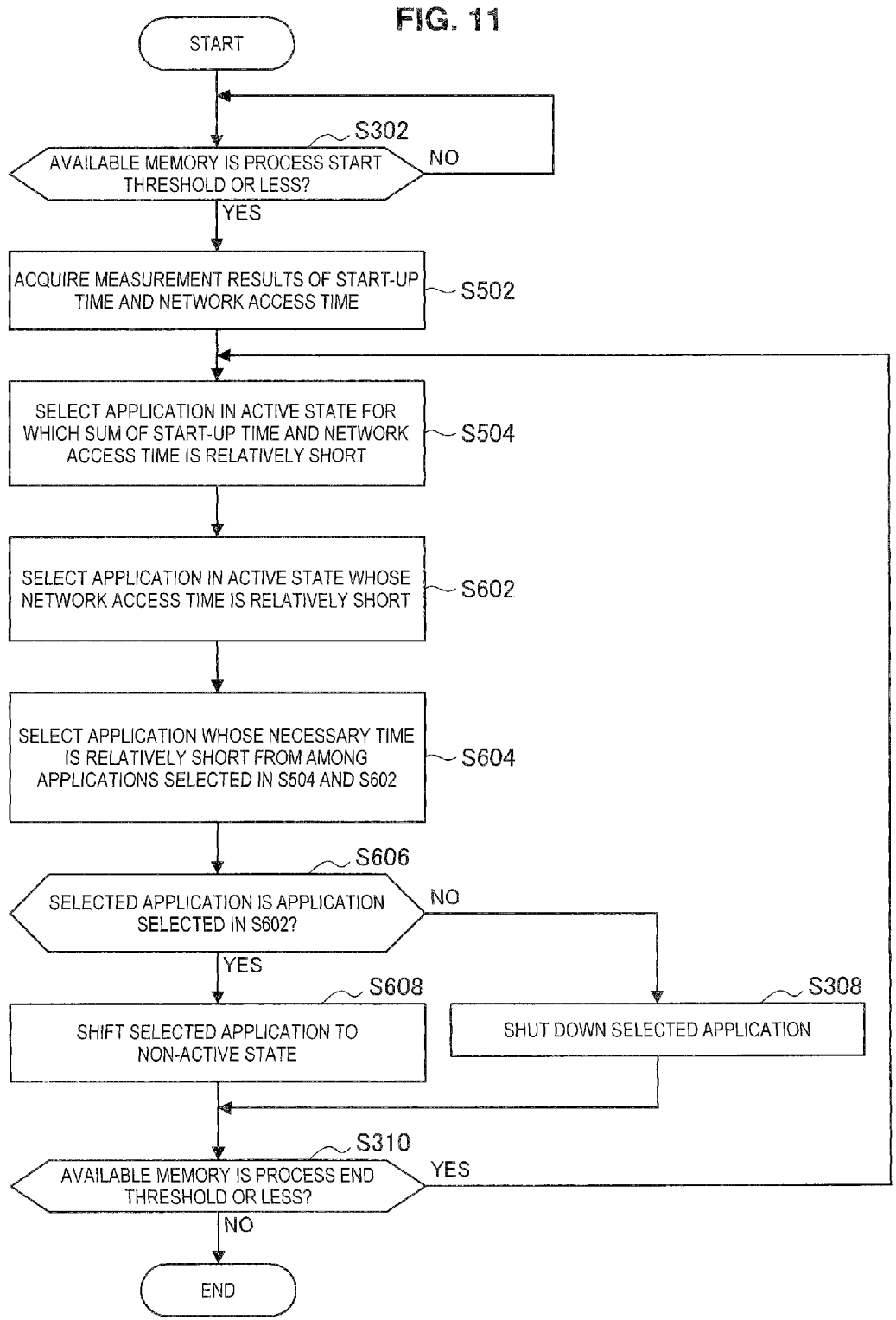
FIG. 11 is a flowchart schematically showing a process of determining shutdown of an application in an information processing apparatus according to the first modification of the second embodiment of the present disclosure.

Next, with reference to FIG. 11, a process in the present modification is explained. FIG. 11 is a flowchart schematically showing a process of determining shutdown of an application in the information processing apparatus 100-2 according to the first modification of the second embodiment of the present disclosure. Note that, explanation overlapping with the explanations of the first embodiment and the second embodiment are omitted.

After executing the processes in Steps S302 to S504, the control unit 114 selects an application in the active state whose network access time is relatively short (Step S602). Specifically, the control unit 114 reads measurement results of the network access time from the memory 110, and selects an application whose read network application time is relatively shorter than other applications. For example, the control unit 114 may select an application whose read network access time is relatively shortest. Note that, the control unit 114 may select an application whose network access time is relatively shorter than certain time. Accordingly, a plurality of applications can be selected.

Next, the control unit 114 selects an application whose necessary time is relatively short from among the applications selected in Steps S504 and S602 (Step S604). Specifically, the control unit 114 sets the sum of the start-up time and the network access time as a target for comparison with regard to each of the applications selected in Step S504, and sets the network access time as a target for comparison with regard to each of the applications selected in Step S602, and selects an application having relatively short time.

Next, the control unit 114 determines whether the selected application is the application selected in Step S602 (Step S606).

In Step S606, in a case where it is determined that the selected application is the application selected in Step S602, the control unit 114 shifts the selected application to the non-active state (Step S608). Specifically, the control unit 114 notifies the application management unit 104 of an instruction for shifting the selected application to the non-active state. The application management unit 104 shifts a state of the application relating to the notification to the non-active state. For example, the application management unit 104 may minimize the window of the application relating to the notification.

Alternatively, in Step S606, in a case where it is determined that the selected application is not the application selected in Step S602, the process proceeds to Step S308.

After the process in Step S608 or S308 is executed, the process proceeds to Step S310. Note that, in a case where the available memory is 10% or less in Step S310, the process returns to Step S504.

As described above, according to the first modification of the present embodiment, the control unit 114 shifts a state of an application to the non-active state, the application having network access time relatively shorter than other applications. Accordingly, the state of the application is shifted to the non-active state, the application having short network access time when shifting from the non-active state to the active state. In this way, it is possible to shorten the waiting time until the state of the application is shifted to the active state in comparison with a case where the application is shut down while a part of computational resources allocated to the application is released.

Note that, the example that the control unit 114 performs the process for shifting the state of the application to the non-active state or the non-running state has been explained above. However, it is also possible for the control unit 114 to perform only a process for shifting the state of the application to the non-active state. In this case, the application does not have to be restarted. Accordingly, convenience of the user can be improved.

(Second Modification)

As a second modification of the present embodiment, the control unit 114 shifts a state of an application to the non-running state, the application being in the non-active state that is specified on the basis of the start-up time length and the network access time length. Specifically, the control unit 114 shifts an application in the non-active state to the non-running state, the application having network access time longer than the start-up time. For example, as shown in FIG. 11, in a case where an application in the non-active state is shut down by the control unit 114 in addition to a case where the application is shut down by a user operation, the state of the application shifts to the non-running state.

Figure 12:
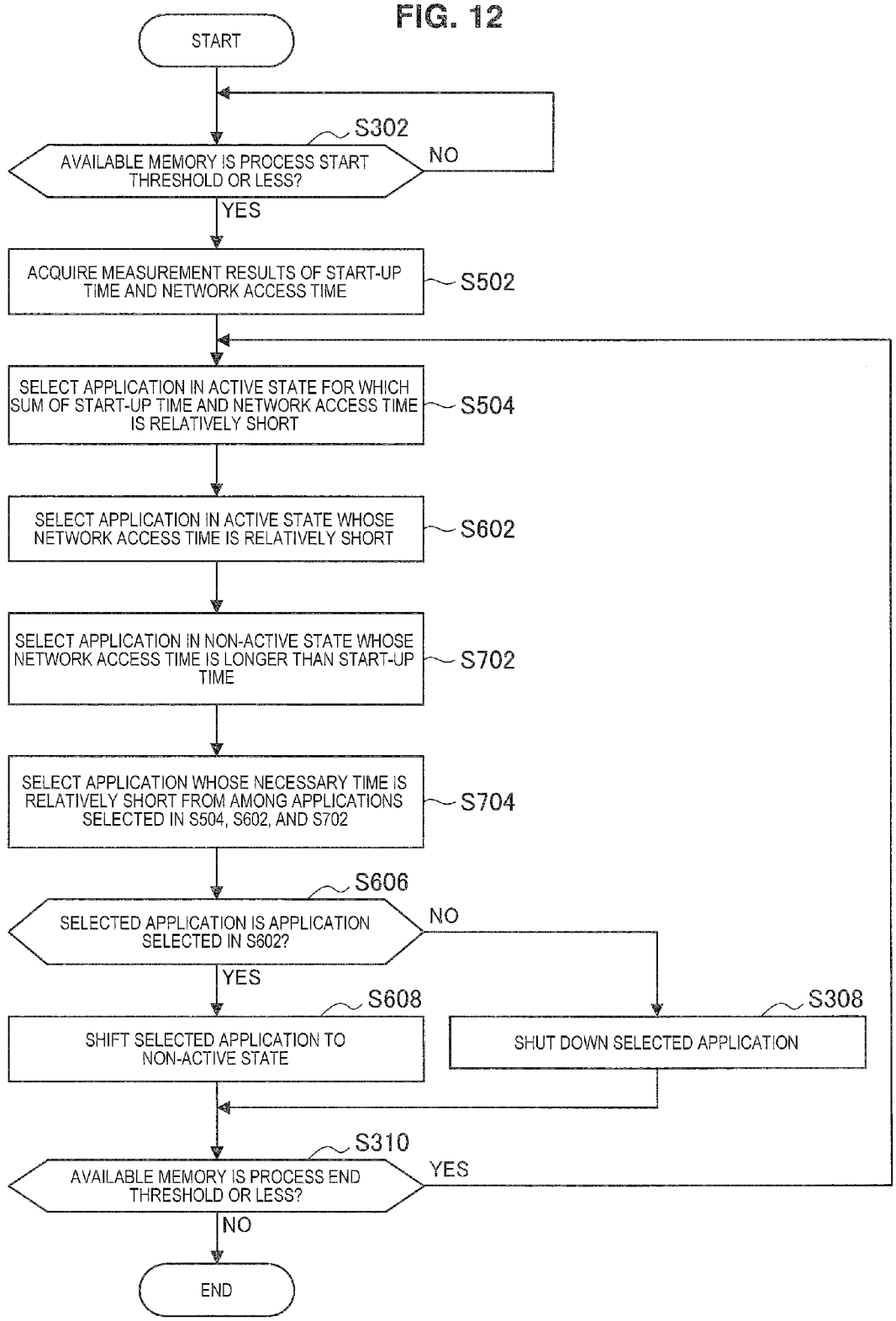
FIG. 12 is a flowchart schematically showing a process of determining shutdown of an application in an information processing apparatus according to a second modification of the second embodiment of the present disclosure.

Next, with reference to FIG. 12, a process in the present modification is explained. FIG. 12 is a flowchart schematically showing a process of determining shutdown of an application in the information processing apparatus 100-2 according to the second modification of the second embodiment of the present disclosure. Note that, explanation overlapping with the explanations of the first embodiment, the second embodiment, and the first modification are omitted.

After executing the processes in Steps S302 to S602, the control unit 114 selects an application in the non-active state whose network access time is longer than the start-up time (Step S702). Specifically, the control unit 114 reads measurement results of the start-up time and the network access time from the memory 110, and selects an application whose network access time is longer than the start-up time. Note that, it is also possible for the control unit 114 to select an application whose network access time is longer than the start-up time by certain time. Alternatively, the control unit 114 may select an application in which a ratio of the network access time to the start-up time is larger than a certain ratio.

Next, the control unit 114 selects an application whose necessary time is relatively short from among the applications selected in Steps S504, S602, and S702 (Step S704). Specifically, the control unit 114 sets the sum of the start-up time and the network access time as a target for comparison with regard to each of the applications selected in Steps S504 and S702, and sets the network access time as a target for comparison with regard to each of the applications selected in Step S602, and selects an application having relatively short time.

After the process in Step S704 is executed, processes after Step S606 are performed.

As described above, according to the second modification of the present embodiment, the control unit 114 shifts an application in the non-active state to the non-running state, the application having network access time longer than the start-up time. In this way, the state of the application is shifted to the non-running state, the application having small difference between time for shifting from the non-active state to the active state and time for shifting from the non-running state to the active state. Accordingly, an amount of computational resources to be released can increase while increase of waiting time until the state of the application is shifted to the active state is suppressed.

(Third Modification)

As a third modification of the present embodiment, the control unit 114 performs determination of shift of a state of the application in further consideration of existence or non-existence of a network access, a frequency of the network access, or communication traffic in the network access. Specifically, the control unit 114 shifts, to the non-active state or the non-running state, a state of an application for which network access is necessary, in which the number of network access per unit time is larger than a certain number of times, or whose communication traffic in the network access is higher than certain communication traffic.

As described above, according to the third modification of the present embodiment, the control unit 114 shifts a state of an application to the non-active state or the non-running state, the application being specified on the basis of existence or non-existence of a network access, a frequency of the network access, or communication traffic in the network access. Accordingly, for example, even if the network access time is changed by including delay time due to network congestion, it is possible to select an application of which a state is changed without being affected by stability of the network.

4. Hardware Configuration of Information Processing Apparatus According to Embodiment of Present Disclosure The embodiments of the present disclosure have been explained above. The process performed by the information processing apparatus 100 is achieved by operating cooperatively software and hardware of the information processing apparatus 100 described below.

Figure 13:
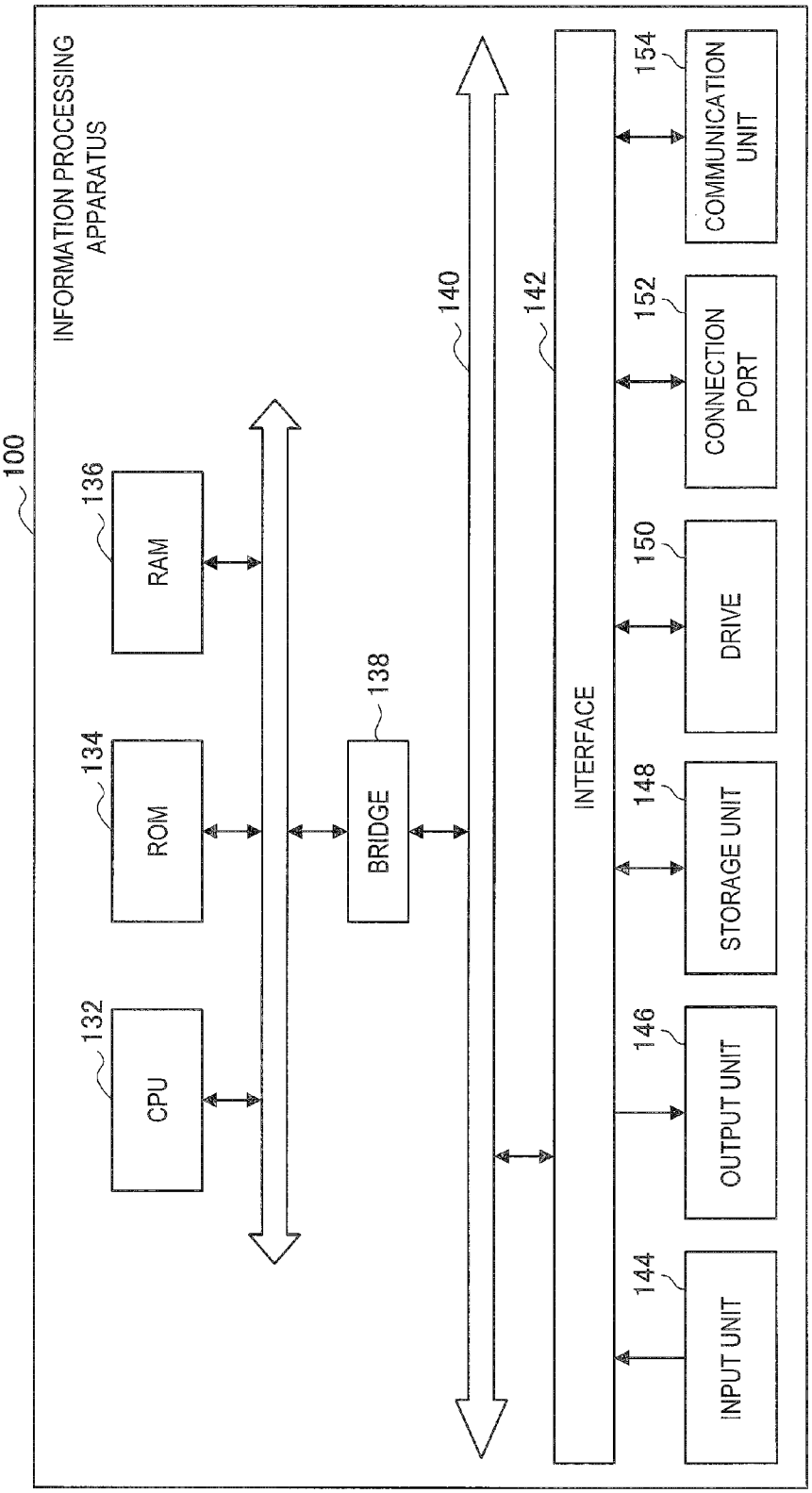
FIG. 13 is an explanatory diagram showing a hardware configuration of an information processing apparatus according to an embodiment of the present disclosure.

FIG. 13 is an explanatory diagram showing a hardware configuration of an information processing apparatus 100 according to an embodiment of the present disclosure. As illustrated in FIG. 13, the information processing apparatus 100 includes a central processing unit (CPU) 132, read only memory (ROM) 134, random access memory (RAM) 136, a bridge 138, a bus 140, an interface 142, an input unit 144, an output unit 146, a storage unit 148, a drive 150, a connection port 152, and a communication unit 154.

The CPU 132 functions as an arithmetic processing unit and a control unit, and achieves the operation detection unit 102, the application management unit 104, the window management unit 106, the resource monitoring unit 112, and the control unit 114 in the information processing apparatus 100 by operating cooperatively with diverse programs. The CPU 132 may be a microprocessor. The ROM 134 stores a program, a calculation parameter, and the like used by the CPU 132. The RAM 136 transiently stores programs used when the CPU 132 is executed, and various parameters that change as appropriate when executing such programs. The ROM 134 and the RAM 136 achieves a part of the memory 1110 in the information processing apparatus 100. The CPU 132, the ROM 134, and the RAM 136 are connected to each other via an internal bus configured of a CPU bus or the like.

The input unit 144 includes: an input mechanism used by the user for imputing information, such as a mouse, a keyboard, a touch screen, a button, a microphone, a switch, or a lever; an input control circuit configured to generate an input signal based on user input and to output the signal to the CPU 132; and the like. By operating the input unit 144, the user of the information processing apparatus 100 can input various data into the information processing apparatus 100 and instruct the information processing apparatus 100 to perform a processing operation.

As an example of the display unit 108 of the information processing apparatus 100, the output unit 146 performs output to a liquid crystal display (LCD) device, an organic light emitting diode (OLED) device, or a lamp. Further, the output unit 146 may perform sound output to a speaker or headphones.

The storage unit 148 is a unit for data storage. The storage unit 148 may include a storage medium, a recording unit which records data in a storage medium, a reader unit which reads data from a storage medium, a deletion unit which deletes data recorded in a storage medium, and the like. The storage unit 148 stores therein the programs executed by the CPU 132 and various data.

The drive 150 is a reader/writer for a recording medium, and is incorporated in or externally attached to the information processing device 100. The drive 150 reads information recorded on a removable recording medium that is mounted such as a magnetic disk, an optical disc, a magneto-optical disk, or semiconductor memory, and outputs the information to the RAM 134. The drive 150 also writes information to the removable recording medium.

The connection port 152 is a bus for connecting with peripheral equipment or an information processing apparatus external to the information processing apparatus 100, for example. The connection port may 152 may be a universal serial bus (USB).

As an example of the communication unit 120 of the information processing apparatus 100, the communication unit 154 is, for example, a communication interface including a communication device for connection to a network. Further, the communication unit 154 may be a device corresponding to infrared communication, a communication device corresponding to a wireless local area network (LAN), a communication device corresponding to long term evolution (LTE), or a wire communication device that performs wired communication.

5. Conclusion

According to the first embodiment of the present disclosure, in a case where the shutdown application is restarted, it is possible to restart the shutdown application in time shorter than restart time in a case of shutting down another application. Accordingly, it is possible to suppress increase of user waiting time for restarting the application. In addition, according to the second embodiment of the present disclosure, an application is selected in consideration of not only the start-up time but also the network access time. Accordingly, it is possible to suppress increase of user waiting time until a state of the application shifts to the active state.

Hereinabove, although the exemplary embodiment of the present disclosure has been described in detail with reference to the accompanying drawings, the technical scope of the present disclosure is not limited thereto. It should be understood by those skilled in the art that various modifications, combinations, sub-combinations and alterations may occur depending on design requirements and other factors insofar as they are within the scope of the appended claims or the equivalents thereof For example, according to the above-described embodiments, the application management unit 104 shuts down the application. However, the present technology is not limited thereto. For example, the application management unit 104 may save a state of an application and related data on the memory in an auxiliary storage device or the like, before the application is shut down. In this way, by reading information about the shutdown application from the auxiliary storage device or the like, it is possible to restart the application in a same state as before shut down. Note that, with regard to the above-described processes, it may be possible to select whether to perform the process. For example, it may be possible to select whether to perform the process for each application.

In addition, the advantageous effects described in the specification are merely explanatory or illustrative, and are not limited. In other words, the technology according to the present disclosure can exert other advantageous effects that are clear to those skilled in the art from the description of the specification, in addition to or instead of the advantageous effects described above.

Additionally, the present technology may also be configured as below.

(1) An information processing apparatus including:
a determination unit configured to determine, for each application, shift time length for each state shift while an application changes from a non-usable state to a usable state; and
a control unit configured to shift a state of an application to the non-usable state, the application being specified on the basis of a result of the determination by the determination unit.

(2) The information processing apparatus according to (1),
wherein the non-usable state is a non-running state of an application,
wherein the shift time length for each of the state shift includes start-up time length of an application, and
wherein the control unit shifts a state of an application to the non-running state, the application being in the usable state that is specified on the basis of the start-up time length according to a result of the determination by the determination unit.

(3) The information processing apparatus according to (2),
wherein the shift time length for each of the state shift further includes network access time length of an application, and
wherein the control unit shifts a state of an application to the non-running state, the application being in the usable state that is specified on the basis of the start-up time length and the network access time length which are according to a result of the determination by the determination unit.

(4) The information processing apparatus according to (3),
wherein the non-usable state further includes a non-operated state, and
wherein the control unit shifts a state of an application to the non-operated state, the application being in the usable state that is specified on the basis of the network access time length according to a result of the determination by the determination unit.

(5) The information processing apparatus according to (4),
wherein the control unit shifts a state of an application to the non-running state, the application being in the non-operated state that is specified on the basis of the start-up time length and the network access time length which are according to a result of the determination by the determination unit.

(6) The information processing apparatus according to any one of (1) to (5),
wherein the control unit performs determination of shift of a state of the application in further consideration of a usage situation of a computational resource.

(7) The information processing apparatus according to any one of (1) to (6),
wherein the control unit performs determination of shift of a state of the application in further consideration of elapsed time length of an application in the usable state.

(8) The information processing apparatus according to (7),
wherein the elapsed time length is time length elapsed after a last operation performed on an application.

(9) The information processing apparatus according to (1) or (2),
wherein the control unit performs determination of shift of a state of the application in further consideration of existence or non-existence of a network access, a frequency of the network access, or communication traffic in the network access.

(10) The information processing apparatus according to (1),
wherein the non-usable state is a non-operated state,
wherein the shift time length for each of the state shift includes network access time length of an application, and
wherein the control unit shifts a state of an application to the non-operated state, the application being specified on the basis of the network access time length according to a result of the determination by the determination unit.

(11) An information processing method including:
determining, for each application, shift time length for each state shift while an application changes from a non-usable state to a usable state; and
shifting a state of an application to the non-usable state, the application being specified on the basis of a result of the determination.

(12) A non-transitory computer-readable storage medium having a program stored therein, the program causing a computer to function as:
a determination unit configured to determine, for each application, shift time length for each state shift while an application changes from a non-usable state to a usable state; and
a control unit configured to shift a state of an application to the non-usable state, the application being specified on the basis of a result of the determination by the determination unit.

What is claimed is:
1. An information processing apparatus, comprising:
at least one processor configured to:
acquire, based on a first threshold value that corresponds to available computational resources, a shift time length for each state shift of an application from a non-usable state to a usable state,
wherein the shift time length comprises a network access time length to shift a state of the application from a state in which the application is configured to access a network to a state in which the application is configured not to access the network;
determine whether a value of the available computational resources is greater than a second threshold value, wherein the second threshold value is greater than the first threshold value; and
shift the state of the application to the non-usable state, wherein the application is specified based on the determination.

2. The information processing apparatus according to claim 1,
wherein the non-usable state is a non-running state of the application,
wherein the shift time length for each of the state shift includes a start-up time length of the application,
wherein the at least one processor is further configured to shift the state of the application to the non-running state, and
wherein the application is in the usable state, and the application is specified based on the start-up time length.

3. The information processing apparatus according to claim 2,
wherein the at least one processor is further configured to shift the state of the application to the non-running state, and
wherein the application is in the usable state and the application is specified based on the start-up time length and the network access time length.

4. The information processing apparatus according to claim 1,
wherein the non-usable state further includes a non-operated state,
wherein the at least one processor is further configured to shift the state of the application to the non-operated state, and
wherein the application is in the usable state and the application is specified based on the network access time length.

5. The information processing apparatus according to claim 1,
wherein the non-usable state further includes a non-operated state and a non-running state,
wherein the at least one processor is further configured to shift the state of the application to the non-running state, and
wherein the application is in the non-operated state and the application is specified based on the start-up time length and the network access time length.

6. The information processing apparatus according to claim 1,
wherein the at least one processor is further configured to determine shift of the state of the application in further based on a usage situation of a computational resource.

7. The information processing apparatus according to claim 1,
wherein the at least one processor is further configured to determine shift of the state of the application in further based on an elapsed time length of the application in the usable state.

8. The information processing apparatus according to claim 7,
wherein the elapsed time length is a time length elapsed after a last operation of the application.

9. The information processing apparatus according to claim 1,
wherein the at least one processor is further configured to determine shift of the state of the application in further based on at least one of existence or non-existence of a network access, a frequency of the network access, or communication traffic in the network access.

10. The information processing apparatus according to claim 1, wherein the non-usable state is a non-operated state, wherein the at least one processor is further configured to shift the state of the application to the non-operated state, and wherein the application is specified based on the network access time length.

11. An information processing method, comprising:

acquiring, based on a first threshold value corresponding to available computational resources, a shift time length for each state shift of an application from a non-usable state to a usable state;

wherein the shift time length comprises a network access time length to shift a state of the application from a state in which the application is configured to access a network to a state in which the application is configured not to access the network;

determining, whether a value of the available computational resources is greater than a second threshold value, wherein the second threshold value is greater than the first threshold value; and shifting the state of the application to the non-usable state, wherein the application is specified based on the determination.

12. A non-transitory computer-readable medium having stored thereon computer-executable instructions that, when executed by a processor, cause a computer to execute operations, the operations comprising:

acquiring, based on a first threshold value corresponding to available computational resources, a shift time length for each state shift of an application from a non-usable state to a usable state, wherein the shift time length comprises a network access time length to shift a state of the application from a state in which the application is configured to access a network to a state in which the application is configured not to access the network;

determining, whether a value of the available computational resources is greater than a second threshold value, wherein the second threshold value is greater than the first threshold value; and shifting the state of the application to the non-usable state, wherein the application is specified based on the determination.

* * * * *